United States Patent Office 3,186,826
Patented June 1, 1965

3,186,826
SOIL IMPROVER AND PROCESS FOR
PREPARING SAME
Margarita del Muro de Rendon, Division Del Norte Ave.,
No. 415-3, Mexico City, Mexico
No Drawing. Filed Oct. 9, 1963, Ser. No. 314,857
7 Claims. (Cl. 71—6)

This application is a continuation-in-part of application Serial No. 201,748, filed June 12, 1962, now abandoned.

The present invention refers to a biochemical soil improver and to a process for manufacturing it and more particularly, it is related to a process for preparing a biochemical soil improver, which comprises a mixture of different strains of microorganisms of the species *Thiobacillusthiooxidans*, *T. thioparus* and *T. denitrificans*, with sulphur added, and to the process for manufacturing said product. The invention is also more particularly directed to a product of the above nature by means of which an improvement is effected on salt-, alkali- or salt-alkali-containing soils in order to improve their condition, in a shorter time and with lesser doses than if sulphur alone is used, controlling the excess of alkali, reducing the pH values of the soil and allowing a better assimilation of the nutrients of the soils into a plant.

It is a well known fact that soil might be considered as a physical-chemical-biological complex. It is also well known that there are certain causes which determine the fact that a soil might be classified as a salt-containing, alkali-containing and salt-alkali-containing soil, and this classification is based upon the interchangeable sodium percentage in a soil and upon its percentage of salt.

It is also a well known fact by those skilled in the soil art, that the dissociation of the salts in water, gives raise to "ions"; and that the presence of one or more ions in the salt, if it is contained in excess, causes the formation of alkaline bases with the consequent increase in the pH value, which of course avoids the optimum solubilization of a great part of the nutrients with the consequent prejudice for the plant, because it cannot be correctly nourished.

Agricultural soils having these characteristics, heretofore have received mechanical and agricultural engineering treatments, such as drainage constructions, and soil lixiviations, in order to carry the salts down to lower layers and to avoid substantial amounts thereof in the crop layer.

The desirability of applying a solid improver of the acidifying type, prior to washing of soil to lixiviate the salt, resides in transforming all excess of sodium, calcium and magnesium ions and the like, into sulfates (by oxidation of sulphur to sulphuric acid by the action of microorganisms of the genus Thiobacillus). This allows the removal of the above mentioned ions by washing out the excess thereof, previously transforming the alkaline bases into sulfates which are easily soluble in water and can be washed out of the crop radicule zone.

The main improvement thus achieved is the removal of sodium in the form of sodium sulfate, thereby avoiding the washing of the salt with water, when the solid improver has not been applied, from causing hydrolysis of sodium ions with the consequent dispersion of the clay and increase in the pH values of the soil. The water washing without prior application of the improver to a soil classified as salt-alkali-containing soil, is able to transform it into an alkali-containing soil because of the above reason.

Another very important reason to apply a soil improver to the soils before washing thereof, is to allow hydration of the clays by means of the hydrogen ions from sulphuric acid formed by the oxidation of sulphur with the aid of microorganisms of the above strains.

It is a well known fact, and many workers have proved it, that a sulphur supply to the soil, will cause oxidation, when said soils contain predetermined microorganisms of the genus Thiobacillus which transforms the sulphur into sulphuric acids as the final product of the reactions characteristic thereof and permit thereby the acidification of the soil.

Therefore, one of the main objects of the present invention is to provide a product which will act as a soil improver with an acidifying character, to be applied to saline, alkaline and saline-alkaline soils, and which will effect said acidification in a very effective manner and without the aid of any other acidifying agent.

Another object of the present invention is to provide a soil improver of the above character, wherein in a series of carriers, plurality of strains of microorganisms of the genus Thiobacillus are included, together with a certain amount of sulphur, to avoid the individual application of sulphur to the soil so submitting its action to the doubtful presence of various necessary strains of the above mentioned Thiobacillus genus.

A more detailed object of the present invention is to provide a product of the above character, wherein microorganisms of the species *Thiobacillus thiooxidans*, *T. thioparus* and *T. denitrificans* are included altogether, in order to oxidize the sulphur added with the product, in a more efficient and complete manner.

Other objects and advantages of the present invention will be obvious to anyone skilled in the art, and still others will appear in the following detailed description of several preferred embodiments thereof, which will be given together with the reactions involved in the action of the microorganisms of the present product, to better illustrate the present invention.

The equations which represent the reactions effected by *Thiobacillus thiooxidans* are as follows:

$$2S + 3O_2 + 2H_2O \rightarrow 2\underline{H_2SO_4}$$
$$Na_2S_2O_3 + 2O_2 + 2H_2O \rightarrow \underline{Na_2SO_4} + 6\underline{H_2SO_4}$$
$$2Na_2S_4O_6 + 7O_2 + 6H_2O \rightarrow 2\underline{Na_2SO_4} + 6\underline{H_2SO_4}$$

The oxidative action of the organism is expressed by the corresponding oxygen atoms which are included in each one of the above equations. As it is well known, the source of the energy for the growth of these organisms is mainly the oxidation of elemental sulphur, however, thiosulfate and tetrathionate are also readily oxidated.

The above microorganism effects an optimal growth at a pH of from 2.0 to 3.0 and, according to the works of Waksman and Starkey, it is distinguished from any other known microorganism in that it is able to tolerate and to produce extremely high concentrations of sulphuric acid, which is a mineral and non-organic acid.

On the other hand, the equations which express the reactions effected by *Thiobacillus thioparus* are as follows:

Starkey's equation:

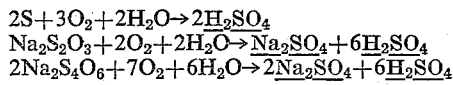
$$5Na_2S_2O_3 + 4O_2 + H_2 \rightarrow 5Na_2SO_4 + \underline{H_2SO_4} + 4\underline{S}$$
$$\phantom{5Na_2S_2O_3 + 4O_2 + H_2 \rightarrow 5Na_2SO_4 + }60\% \quad 40\%$$

Beijerinck's equation:

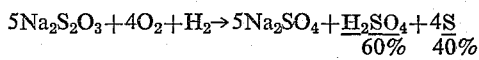
$$Na_2S_4O_6 + Na_2CO_3 + O \rightarrow 2\underline{Na_2SO_4} + \underline{Co_2} + 2\underline{S}$$
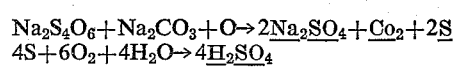
$$4S + 6O_2 + 4H_2O \rightarrow 4\underline{H_2SO_4}$$

This organism produces oxidative action on thiosulphate as well as on elemental sulphur. The organism grows in a neutral or slightly alkaline medium. From the above equations, it can be concluded that this particular microorganism is capable of producing oxidation of thiosulphate and tetrathionate, and supplies sulphuric acid as a result of said oxidation and also an abundant production of elemental sulphur.

In view of the above equations, it can be easily seen that by mixing, in a soil improver, microorganisms of *Thiobacillus thiooxidans, Thiobacillus thioparus* and *T. denitrificans* as well as sulphur, a very efficient transformation of sulphur into sulphuric acid will be obtained, because a very suitable production of sulphuric acid from thiosulfates and tetrathionates will be obtained by the action of *Thiobacillus thioparus* while the sulphur existing in the product plus the sulphur produced by *Thiobacillus thioparus* will be transformed into sulphuric acid which will be a very efficient acidifying agent for the soils treated with a product containing those microorganisms. All sulphur contained in the product and produced by *Thiobacillus thioparus*, will be further oxidized by *Thiobacillus thiooxidans* as above mentioned, so that the resulting production of sulphuric acid will be considerably increased and the acidifying capability of this agent will be consequently increased.

With the addition of these organisms to the prime materials mix, the elemental sulphur produced by the above mentioned reactions will be oxidized again by the intervention of *Thiobacillus thiooxidans*, forming in this way a continuity of reactions of oxidative character in soil medium, allowing the modification of the soil to be done in a shorter period of time.

Finally, the equations involved in the action of the microorganism *Thiobacillus denitrificans* are as follows:

Under aerobic conditions:

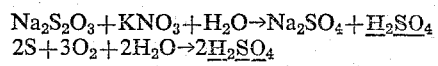

Under anaerobic conditions:

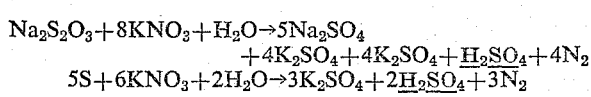

This particular microorganism grows perferably in a neutral medium and, of course, it is capable of oxidizing elemental sulphur as well as thiosulphate, under aerobic and anaerobic conditions.

According to the above equations which represent the reactions involved in the biochemical activity of each one of the microorganisms, it will be clearly seen that a product containing mixtures of the three microorganisms, will be very effective to perform oxidation of elemental sulphur and of salts containing sulphur, such as the thiosulphate and the tetrathionate, so that the product of the present invention which contains the three strains of microorganisms is highly effective as acidifying agent for soils containing salt, alkali, or saltalkali.

In order to obtain raw cultures of these organisms, they were isolated from samples of volcanic soils.

The cultures were finally isolated in a pure form following methods known in the art for the growth of microorganisms of this type, and the following examples give in an illustrative manner, some preferred methods to isolate the microorganisms from the volcanic soils, but it must be understood that these examples must not be construed as limitative but only as illustrative of the present invention.

A preferred embodiment of the invention provides a composition for its application to the soils, which comprises per ton of the total composition, 2.16 gallons of a mixture of broths containing *T. thiooxidans, T. thioparus* and *T. denitrificans*, 0.72 gallon each; about 1,500 pounds of sulphur flour; about 300 pounds of peat; about 20 pounds of activated charcoal and about 180 pounds of calcium sulphate, depending of course on the nature and composition of the soil where the composition is to be applied.

EXAMPLE 1

*Thiobacillus thiooxidans* was isolated following the method described below:

Phosphoric rock powder and sulphur powder were added to a sample of volcanic soil. Water was also added to obtain the best conditions for the growth of the organisms. Incubation was started at 25° C. for a suitable period of time, determining the presence of such organisms by means of the usual potentiometric methods, effected at certain intervals of time.

The presence of this sulphur oxidizing bacterium is a function of the variations of the pH rate. After 90 days of incubation, in order to proceed to isolate the organism in a pure culture, Starkey's medium, having a composition as stated in the following lines, was inoculated with one gram of this sample:

| | | |
|---|---|---|
| Ammonium sulphate, $(NH_4)_2SO_4$ | gm | 0.2 |
| Magnesium sulphate, $MgSO_4 7H_2O$ | gm | 0.5 |
| Calcium chloride, $CaCl_2$ | gm | 0.25 |
| Ferrous sulphate, $FeSO_4 7H_2O$ | gm | 0.01 |
| Precipitated sulphur | gms | 10.00 |
| Distilled water | ml | 1000 |

Portions of one gram of precipitated sulphur were placed in ten dry 250 ml. flasks, covering the bottom of the flasks. 100 ml. of the mineral solution of the medium were carefully poured in each flask, in such a way that the sulphur floated. Afterwards each flask was sterilized with a stream of steam for half an hour and this operation was repeated for three consecutive days. The incubation time varies from 10 days to 2 weeks at room temperature.

A very pure culture of the microorganism *Thiobacillus thiooxidans* was obtained, quite suitable to be used in the preparation of the soil improver of the present invention.

EXAMPLE 2

*Thiobacillus thioparus* was also isolated from raw cultures obtained from a volcanic soil sample, by means of the process which comprises first preparing a Beijerinck's medium, which composition is as follows:

| | | |
|---|---|---|
| Sodium thiosulphate, $Na_2S_2O_3 \cdot 5H_2O$ | gms | 5.0 |
| Ammonium chloride, $NH_4Cl$ | gm | 0.1 |
| Sodium bicarbonate, $NaHCO_3$ | gm | 1.0 |
| Disodium phosphate, $Na_2HPO_4 \cdot 2H_2O$ | gm | 0.2 |
| Magnesium chloride, $MgCl_2 \cdot 6H_2O$ | gm | 0.1 |
| Tap water | ml | 1000 |

Sodium thiosulphate and carbonate are separately sterilized in a small portion of water, and added to the solution of the other salts. Before use, a few drops of sterilized ferrous sulphate was added to the solution. This solution is distributed in flasks of 250 ml. (100 ml. in each flask) and these portions are inoculated with one gram of the oxidized soil sample. Each week the oxidized thiosulphate is determined by means of an iodine solution according to the recommended standard method. When there is evidence of disappearance of thiosulphate, the organism is observed through microscope, verifying the presence of precipitated sulphur granules.

To prepare pure liquid cultures of the above organism, colonies thereof are transferred by means of inoculation, to a mixture of the three following media as stated below:

(1)

| | | |
|---|---|---|
| $K_2HPO_4$ | gm | 2.0 |
| $CaCl_2$ | gm | 0.1 |
| $MgSO_4$ | gm | 0.1 |
| $MnSO_4$ | | Traces |
| $FeSO_4$ | | Traces |
| Tap water | ml | 900 |

The pH of the above mixture is adjusted to 7.8 and 90 ml. portions thereof are distributed in each one of ten 250 ml. flasks.

(2)

| | | |
|---|---|---|
| $Na_2S_2O_3$ | gms | 10.0 |
| Tap water | ml | 50 |

This solution is sterilized separately in flasks.

(3)

$(NH_4)_2SO_4$ ———————————————————— gm__ 0.1
Tap water ———————————————————— ml__ 50

This solution is also sterilized separately in flasks.

The above media, before undergoing inoculation, are mixed in the proportions of 90 ml. of medium (1) per 5 ml. of each one of mediums (2) and (3). The time of incubation for the microorganisms is generally of from 10 days to two weeks at room temperature.

As *Thiobacillus denitrificans* grow aerobically in the absence of nitrate, but needs nitrate or ammonia when growing anaerobically, in order to proceed to the isolation thereof, a mixture of soil which was fertilized with manure was used to inoculate the following medium (Trautwein):

Potassium nitrate, $KNO_3$ ———————————— gm__ 1.0
Disodium phosphate, $Na_2HPO_4 \cdot 2H_2O$ ———— gm__ 0.1
Sodium thiosulphate, $Na_2S_2O_3 \cdot 5H_2O$ ———— gms__ 2.0
Sodium bicarbonate, $NaHCO_3$ ——————————— gm__ 0.1
Magnesium chloride, $MgCl_2 \cdot 6H_2O$ —————— gm__ 0.1
Distilled water ————————————————— ml__ 1000

In order to proceed to inoculation, the above medium was distributed in several tubes.

As a separate operation, the above medium but without the thiosulphate and with 1.5% agar added is charged in flasks of 50 ml. The resulting mixture is poured in plates and then 0.25 gm. of $Na_2S_2O_5 \cdot 5H_2O$ is added per each 50 ml. of the agar thus obtained, from a previously sterilized stock solution.

The tubes having the above medium, were inoculated with 0.5 gram of the soil sample, and were incubated under anaerobic conditions for 2 weeks at room temperature. At the end of the above incubation period, the amount of oxidized sodium thiosulphate was calculated by the conventional methods of iodine titration.

Afterwards, the inoculated tubes were used to pour 1 ml. of each one of them into each one of the plates containing thiosulphate agar, and the resulting mixtures were incubated for a week at room temperature. The colonies of *Thiobacillus denitrificans* thus obtained are thin, clear, or weakly opalescent.

Once having determined the presence of *Thiobacillus denitrificans*, the following culture medium is prepared and inoculated with the above colonies of the isolated organisms.

$NH_4Cl$ ———————————————————— gm__ 0.5
$MgSO_4 \cdot 7H_2O$ —————————————————— gm__ 0.6
$KNO_3$ ———————————————————— gms__ 4.0
Tap water ———————————————————— ml__ 1000

100 ml. of the above solution are treated with 1 gram of sodium thiosulphate and the solution is distributed in long tubes with 10 ml. of solution per each tube.

To each one of the above tubes, 2 drops of the following solution are added aseptically:

(A)

$FeSO_4 \cdot 7H_2O$ —————————————————— gm__ 1.0
$H_2SO_4 \cdot (0.02N)$ ————————————————— ml__ 1000

To each one of the tubes 0.1 ml. of the following solution were added:

(B)

$NaHCO_3$ ———————————————————— gms__ 5.0
Tap water ———————————————————— ml__ 50

Finally, 0.2 ml. of the following solution were added to each one of the above tubes:

(C)

$KH_2PO_4$ ———————————————————— gms__ 5.0
Tap water ———————————————————— ml__ 50

The incubation was effected at a growing temperature of 30° C. and the transfer time was of from 1 to 2 months.

EXAMPLE 3

Each one of the isolated colonies of microorganisms obtained according to the preceding examples, are separately transferred to larger amounts of each one of the culture mediums suitable for the particular microorganisms, so that each microorganism will be transferred to a volume of 3 lts. of each culture medium; in order to obtain three concentrates of the organisms, each one amounting to 3 liters, which are thereafter mechanically mixed together with 100 kilograms of a suitable carrier material which comprises:

| | Percent |
|---|---|
| Sulphur powder with a purity over a 95%, ground to 325 mesh | 75 |
| Peat from vegetal origin | 15 |
| Activated carbon from vegetal origin | 1 |
| Agricultural gypsum (calcium sulphate) | 9 |
| | 100 |

In the operation of mixing each one of the concentrates having large amounts of the three types of microorganisms to be used for the manufacture of the soil improver of the present invention, strict observance of predetermined moisture conditions must be effected in order to avoid possible death of the several microorganisms, and particularly o of *Thiobacillus thiooxidans*, which microorganism is very sensitive to desiccation, inasmuch as it has been proved (Journal of Bacteriology, vol. X, No. 2, March 1925) that this organism can die in the absence of a substantial amount of moisture.

Therefore, the preferred process according to the present invention to effect this admixture of concentrates with the carrying material is as follows:

3 lts. of each of the concentrates of *Thiobacillus thiooxidans*, *Thiobacillus thioparus* and *Thiobacillus denitrificans*, are mixed by the common mechanical methods with the peat, which moisture must lay between 14 and 15% throughout the whole period of time of elaboration, in order that the organisms will be maintained alive within the optimal conditions of moisture which are necessary.

No sterile conditions need prevail, inasmuch as the great amount of microorganisms present, substantially removed the danger of any contamination.

The activated carbon and the agricultural gypsum were added then to the mixture and finally the sulphur was added to complete the formulation of the above composition.

The activated carbon is added to this mixture with the purpose of stimulating the oxidative reactions the Thiobacillus carry out.

The thus obtained product is then ready for packing, shipping and application to the soil, at doses which will be determined according to the analytical data representative of the soil where it is to be used, and in accordance with the type of soil, whether it be salt-containing, alkali-containing, or salt-alkali-containing, and also depending on the base interchange rate and on the pH of the soil.

The following example is given to illustrate a series of tests effected in order to show the action of the soil improver of the present invention on the particular type of soil, and its influence on the plant growth in that particular soil.

EXAMPLE 4

Five plots of salt-alkali containing soil from the agricultural region of Nuevo Leon, Mexico, were placed in wood boxes and two varieties of wheat were planted in these plots of soil, pertaining to the variety known as "Chapingo 53" and "Lerma Rojo," respectively. The tests were developed in Escuela Superior de Agricultura Antonio Narro, Saltillo, Coahuila, Mexico.

In these greenhouse tests, the soils were selectively treated with a fertilizer and with the soil improver of the present invention and the results two months after planting were as follows.

Test 1

(a) Applied fertilizer: 180 lb./acre (200 kgs./ha.)
No application of soil improver
Budding: 36%
Height: Chapingo 53, 17 10/32" approx. (44 cms.)
Lerma Rojo: 19 3/4" approx. (50 cms.)

(b) Applied fertilizer: 180 lb./acre (200 kgs./ha.)
Soil improver: 180 lb./acre (200 kgs./ha.)
Budding: 66%
Height: Chapingo 53, 26" approx. (66 cms.)
Lerma Rojo: 30 3/4" approx. (78 cms.)

Test 2

(a) No application of soil improver
No application of fertilizer
Budding: 0%
Height: Chapingo 53, 11 3/8" approx. (29 cms.)
Lerma Rojo: 9 1/16" approx. (23 cms.)

(b) Soil improver applied: 180 lb./acre (200 kgs./ha.)
Fertilizer applied: 180 lb./acre (200 kgs./ha.)
Height: Chapingo 53, 36" approx. (66 cms.)
Lerma Rojo: 30 3/4" approx. (78 cms.)
Budding: 66%

(c) Soil improver applied 223 lb./acre (250 kgs./ha.)
Fertilizer applied: 223 lb./acre (250 kgs./ha.)
Height: Chapingo 53, 26 3/4" approx. (68 cms.)
Lerma Rojo: 30 5/16" approx. (77 cms.)
Budding: 87%

It must be understood that all the carrying materials to be mixed with the strains of *Thiobacillus thiooxidans*, *thioparus* and *denitrificans*, according to the invention, can be varied according to the particular characteristics of the soil where they are to be applied and it must also be understood that the only material which is not liable to be changed is sulphur, because sulphur is essential to perform the oxidative action of the microorganisms in order to transform it into sulphuric acid or sulphates, to effect the acidification of soils.

For instance, the peat can be replaced by any other material having the property of maintaining a suitable content of moisture, in order to keep alive the strains of the genus Thiobacillus, inasmuch as these microorganisms, as above mentioned, are very liable to die when in a dry medium. However, any other material having this same particularity of maintaining moisture included, can be used instead of peat.

Under certain conditions, the agriculture gypsum (calcium sulphate) must be removed from the present formulation, while under certain other conditions the use of gypsum will be very effective to provide an effective action of the present soil improver.

In other words, if the soil to be treated is rich in sodium ions, the addition of calcium sulphate to the soil improver is very convenient, in order to provide calcium ions to the clays and flocculate them, regardless of the hydrogen ions from the sulphuric acid formed in the oxidative actions of the species of Thiobacillus with the sulphur present. The reaction effected in the case of a soil rich in sodium ions is as follows:

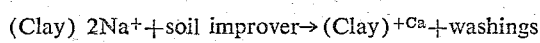

On the contrary, if the soil is saturated with calcium ions, as the present solution also contains excess of calcium, it will provide the soil with a buffering power, which will avoid solubilization and free access of other ions to the crops, with damages to the vegetal nourishment. In this case, the carrier materials with which the improver of the present invention is manufactured, must not contain calcium sulphate or gypsum in their composition, so that no more calcium will be introduced into the soil, and the application of the soil improver thereto will have as a main objective the hydration of the clays, by replacing a major portion of the calcium present by the hydrogen ions from sulphuric acid formed by the oxidative reaction of the microorganisms on sulphur. The reaction effected in this latter case is as follows:

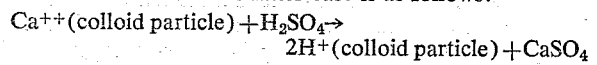

Therefore, the presence or absence of calcium sulphate in the carrier materials used to manufacture the soil improver of the present invention, will depend of course on the nature of the soil and more particularly on the existence or absence or excess of calcium ions or sodium ions, as above described.

When agricultural gypsum is not used, it should be compensated with sulphur in an equivalent percentage.

What I claim is:

1. Composition for reducing the alkalinity of alkaline and saline soils, consisting essentially of (a) a mixture of cultures of bacteria of the species *Thiobacillus thiooxidans*, *Thiobacillus thioparus* and *Thiobacillus denitrificans*, in admixture with a carrier material including (b) finely divided sulfur in an amount sufficient to sustain the sulfur-oxidative action of said bacteria, (c) peat containing from about 40% to about 50% moisture to preserve the viability of the bacteria, (d) activated carbon of vegetable origin in an amount sufficient to catalyze the sulfur oxidative reactions of said bacteria.

2. The composition of claim 1 which includes further an amount of calcium sulfate sufficient to provide calcium ions to be interchanged for sodium ions contained in the soil to be treated.

3. Composition for reducing the alkalinity of alkaline and saline soils, consisting essentially of (a) a mixture of cultures of bacteria of the species *Thiobacillus thiooxidans*, *Thiobacillus thioparus* and *Thiobacillus denitrificans*, in admixture with a carrier material consisting essentially of 75% by weight of finely divided sulfur, 15% by weight of peat containing from about 40% to 50% moisture, 1% by weight of activated carbon of vegetable origin and 9% by weight of agricultural gypsum.

4. A composition for reducing the alkalinity of alkaline and saline soils consisting essentially of a mixture of 0.72 gallon each of nutrient broth cultures of each of the species of bacteria: *Thiobacillus thiooxidans*, *Thiobacillus thioparus* and *Thiobacillus denitrificans*, 1500 pounds of 325-mesh sulfur, 300 pounds of peat containing from about 40% to 50% moisture, 20 pounds of activated charcoal of vegetable origin, and 20 pounds of calcium sulfate.

5. Method for the preparation of a composition for reducing the alkalinity of alkaline and saline soils, comprising the steps of mixing nutrient broth cultures of bacteria of the species *Thiobacillus thiooxidans*, *Thiobacillus thioparus* and *Thiobacillus denitrificans*, with peat containing from about 40% to 50% moisture, to preserve the viability of the baceteria, adding to said mixture an amount of activated carbon sufficient to catalyze the sulfur oxidative reactions of said bacteria, and finally adding to said mixture finely divided sulfur in an amount sufficient to sustain the sulfur oxidative action of said bacteria.

6. The method of claim 5 in which there is further added to the mixture an amount of calcium sulfate sufficient to provide calcium ions to be interchanged for sodium ions contained in the soil to be treated.

7. Method for reducing the alkalinity of alkaline and saline soil which comprises the step of applying to said soil the composition of claim 1.

References Cited by the Examiner

UNITED STATES PATENTS

| | | | |
|---|---|---|---|
| 1,205,829 | 11/16 | Wilkening | 71—6 |
| 1,235,906 | 8/17 | Lipman | 71—6 |
| 1,361,597 | 12/20 | Lipman | 71—6 |
| 2,200,532 | 5/40 | Bond | 71—7 |
| 2,726,948 | 12/55 | Erickson | 71—7 |
| 2,879,151 | 3/59 | Melville | 71—8 |

DONALL H. SYLVESTER, *Primary Examiner.*

ANTHONY SCIAMANNA, *Examiner.*